(12) United States Patent
Hirst

(10) Patent No.: US 8,664,922 B2
(45) Date of Patent: Mar. 4, 2014

(54) SNUBBER CIRCUIT

(75) Inventor: B. Mark Hirst, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/552,571

(22) Filed: Jul. 18, 2012

(65) Prior Publication Data

US 2012/0280674 A1 Nov. 8, 2012

Related U.S. Application Data

(63) Continuation of application No. 10/780,927, filed on Feb. 17, 2004, now Pat. No. 8,253,394.

(51) Int. Cl.
*G05F 1/70* (2006.01)

(52) U.S. Cl.
USPC ............................................. 323/222; 363/16

(58) Field of Classification Search
USPC .................. 363/16–20, 21.4, 21.7, 85, 89, 97, 363/37–40, 132, 56.2, 56.4, 21.06, 21.07, 363/24, 26, 127, 56.01, 36.12; 330/59, 308; 327/304, 427; 323/222, 224, 225, 251, 323/282–290
See application file for complete search history.

(56) References Cited

U.S. PATENT DOCUMENTS

| | | | |
|---|---|---|---|
| 4,319,318 A * | 3/1982 | Rippel et al. .................. | 363/138 |
| 4,321,662 A | 3/1982 | Yokoyama | |
| 4,567,425 A | 1/1986 | Bloomer | |
| 4,675,797 A | 6/1987 | Vinciarelli | |
| 4,717,849 A * | 1/1988 | Shigekane .................... | 327/377 |
| 4,727,308 A | 2/1988 | Huljak et al. | |
| 5,004,969 A | 4/1991 | Schanin | |
| 5,239,255 A | 8/1993 | Schanin et al. | |
| 5,485,365 A | 1/1996 | Dan-Harry | |
| 5,534,768 A * | 7/1996 | Chavannes et al. ........... | 323/267 |
| 5,583,384 A | 12/1996 | Henry | |
| 5,615,094 A | 3/1997 | Cosentino et al. | |
| 5,635,826 A | 6/1997 | Sugawara | |
| 5,636,106 A * | 6/1997 | Batarseh et al. ................ | 363/16 |
| 5,682,050 A | 10/1997 | Williams | |
| 5,694,304 A * | 12/1997 | Telefus et al. .............. | 363/21.03 |
| 5,872,983 A | 2/1999 | Walsh et al. | |
| 5,923,152 A | 7/1999 | Guerrera | |
| 5,946,178 A | 8/1999 | Bijlenga | |
| 6,055,161 A | 4/2000 | Church et al. | |
| 6,097,006 A | 8/2000 | Inukai | |
| 6,236,192 B1 | 5/2001 | Suzuki et al. | |
| 6,259,306 B1 | 7/2001 | Brulhart et al. | |
| 6,268,990 B1 * | 7/2001 | Ogura et al. .................. | 361/91.7 |
| 6,344,979 B1 | 2/2002 | Huang et al. | |
| 6,351,018 B1 | 2/2002 | Sapp | |
| 6,396,724 B1 | 5/2002 | Hirst | |
| 6,434,019 B2 | 8/2002 | Baudelot et al. | |
| 6,438,004 B1 | 8/2002 | Tanaka et al. | |

(Continued)

FOREIGN PATENT DOCUMENTS

| DE | 10045093 | 3/2002 |
|---|---|---|
| DE | 10254408 A1 | 6/2003 |

*Primary Examiner* — Rajnikant Patel

(57) ABSTRACT

A snubber circuit comprises a first energy storage device and circuitry coupled to the first energy storage device to facilitate capturing, by the first energy storage device, energy of a switching circuit. The snubber circuit also comprises a second energy storage device coupled to the first energy storage device to store the captured energy. The circuitry additionally facilitates resetting of the first energy storage device.

20 Claims, 16 Drawing Sheets

(56) References Cited

U.S. PATENT DOCUMENTS

| | | |
|---|---|---|
| 6,445,600 B2 | 9/2002 | Ben-Yaakov |
| 6,521,973 B2 | 2/2003 | Sharples et al. |
| 6,600,145 B1 | 7/2003 | Herz |
| 6,670,842 B2 | 12/2003 | Kamenicky |
| 6,678,175 B1 | 1/2004 | Ferencz et al. |
| 6,807,073 B1 * | 10/2004 | Scarlatescu ............. 363/34 |
| 6,813,168 B2 | 11/2004 | Balakrishnan |
| 7,002,815 B2 * | 2/2006 | Scarlatescu ............. 363/34 |

\* cited by examiner

SNUBBER CIRCUIT

CROSS-REFERENCE TO RELATED APPLICATION

This application claims priority from copending applications having Ser. No. 10/763,664 (entitled "ALTERNATING CURRENT SWITCHING CIRCUIT") and Ser. No. 10/764,409 (entitled "POWER CONVERTER") each of which were filed on Jan. 23, 2004 and each of which are hereby incorporated by reference herein.

BACKGROUND

Alternating Current (AC) circuits comprising inductive loading contain stored energy that, when the circuit is switched off, needs to be dissipated. If this stored energy is not accounted for in the design of the circuit, the result could be a number of undesired effects on the circuit and/or the circuit's surrounding environment.

One undesired effect on the circuit can be the build-up of heat in a circuit. For example, circuitry utilized in a switching device may heat up. This may result in requiring a designer to include a heat sink for a switching device. The addition of a heat sink may add cost to a design.

Another undesirable effect on a circuit with stored inductive energy is that the switching-off of the circuit could result in large discharge transients being dissipated throughout the rest of the circuit. These large discharge transients may cause damage to other circuit elements that absorb the energy of the discharge transients.

Yet, another undesired effect may be radio frequency (RF) emissions over a desired level. Various jurisdictions classify devices and limit the types of devices that can be sold. For example, in the United States, the FCC certifies devices as "Class A" or "Class B" depending on the amount of RF energy that the device emits. "Class B" devices are authorized for home use whereas "Class A" devices are limited to office use.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF THE EMBODIMENTS

Although specific embodiments will be illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein. Therefore, it is manifestly intended that this invention be limited only by the claims.

The following discussion is presented in the context of MOSFET devices. It is understood that the principles described herein may apply to other transistor devices.

Figure 1:
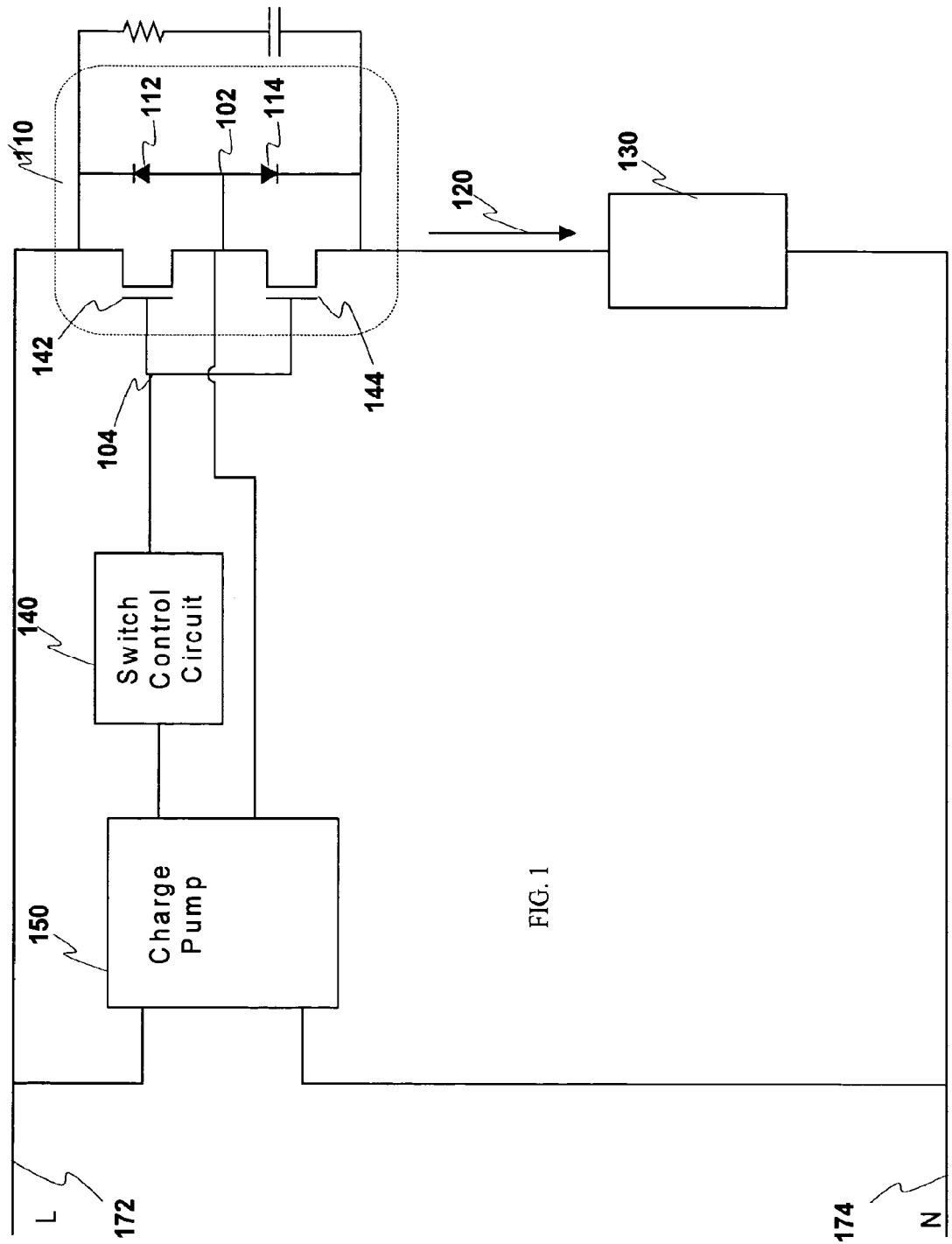
FIG. 1 illustrates an AC MOSFET switch, including anti-parallel diodes, in accordance with one embodiment.

Refer now to FIG. 1 wherein an AC MOSFET switch 110, including anti-parallel diodes 112 114, is illustrated, in accordance with one embodiment. For the MOSFETs 142 144 illustrated, the sources of the MOSFET devices are coupled at junction 102. In one embodiment, MOSFETs 142 144 are power MOSFETs. In addition, the gates are electrically coupled at junction 104. These couplings are to facilitate the operation of the two MOSFETs 142 144 as a single AC MOSFET switch. Thus, by applying a gate to source voltage, $V_{GS}$, greater than the threshold voltage, $V_{TH}$, to the two MOSFETs 142 144, both MOSFETs conduct current 120.

Also illustrated in FIG. 1 are two diodes 112 114. These diodes 112 114, which may be parasitic or explicit, are anti-parallel to their respective MOSFETs. As described in further detail below, these diodes 112 114 may be utilized to bypass the intrinsic anti-parallel diodes of the MOSFETs. Thus, as illustrated, the anodes of the diodes 112 114 are coupled to the sources of the diodes' respective MOSFET and the cathodes are coupled to the respective drains.

FIG. 1 also illustrates the AC MOSFET switch in use in controlling power to a load. As previously mentioned, AC MOSFET switch 110 comprises two MOSFETs 142 144. AC MOSFET switch 110 controls current 120 through load 130. This may be accomplished by switch control circuit 140 which applies the gate-source voltages for the two MOSFETs 142 144 forming the AC MOSFET switch 110. In the embodiment illustrated, charge pump biasing circuit 150 supplies current to switch control circuit 140 from line (L) 172 and neutral (N) 174 connections of the AC power source.

Figure 2:
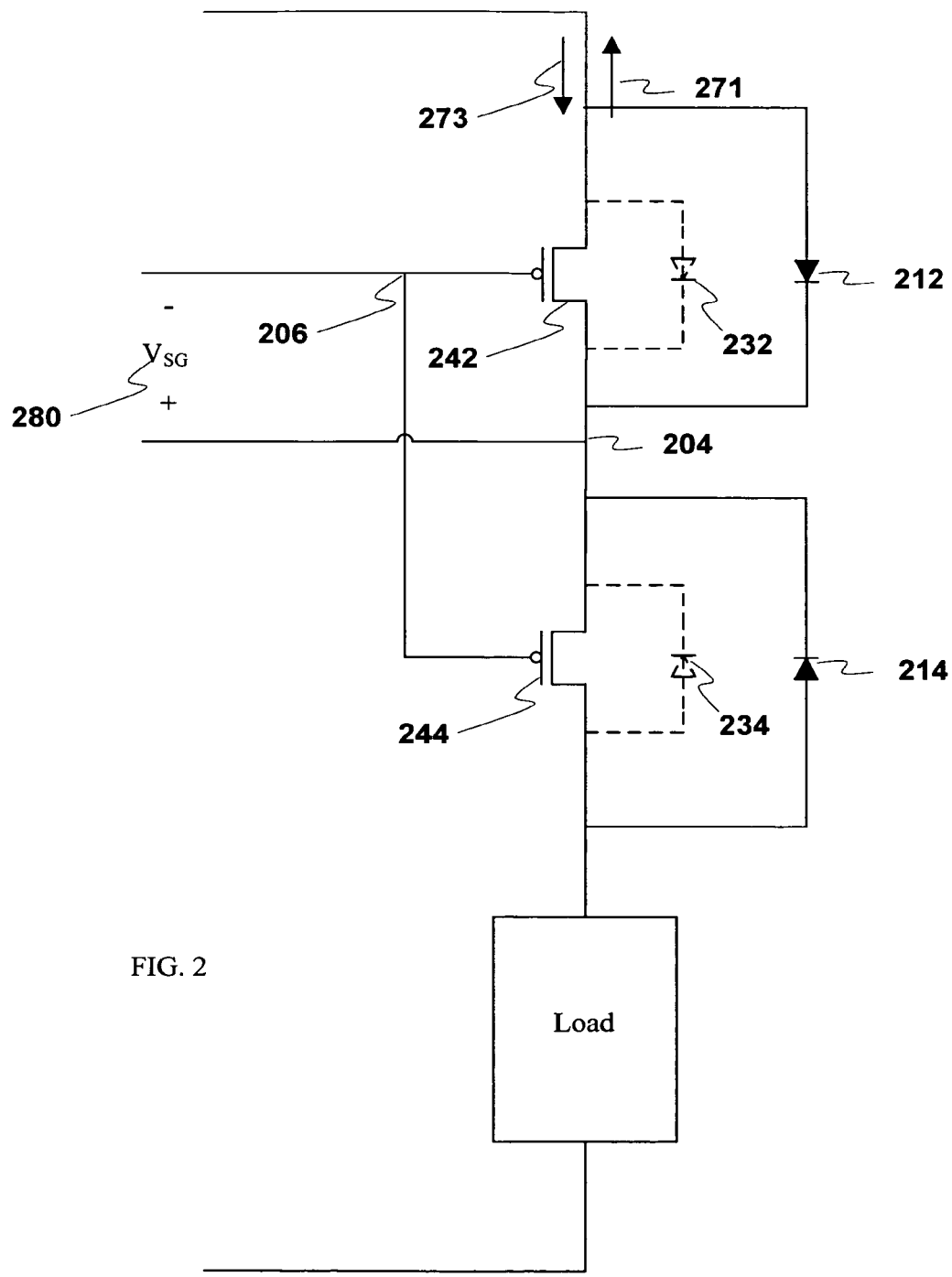
FIG. 2 illustrates a more detailed look at an AC MOSFET switch, including intrinsic parasitic diodes of the MOSFETs, in accordance with one embodiment.

FIG. 2 illustrates a more detailed look at an AC MOSFET switch, utilizing P type MOSFETs, including intrinsic parasitic diodes 232 234 of the MOSFETs 242 244, in accordance with one embodiment. Also illustrated are antiparallel diodes 212 214 which may be utilized to bypass the intrinsic anti-parallel diodes 232 234 of the MOSFETs. Note that the sources of both MOSFETs 242 244 are coupled 204 to each other. In addition, the gates of both MOSFETs 242 244 are coupled 206 to each other. When a voltage, $V_{SG}$ 280 less than a threshold voltage $V_{TH}$ is applied, the MOSFETs 242 244 will be "turned-off" and the internal reverse biased PN junctions will substantially prevent current from flowing through the MOSFETs.

When a voltage, $V_{SG}$ 280 greater than a threshold voltage $V_{TH}$ is applied to the common sources and gates of MOSFETs 242 244 are turned on to facilitate the flow of current through the AC MOSFET switch. Note that current will flow in the reverse direction in MOSFET 242 or 244 depending on the polarity of the AC voltage source. That is, in the reverse direction as is normally used in DC circuits, that is drain to source in an N type MOSFET or source to drain in a P type MOSFET. The reverse current flow causes no problem as the MOSFET transistor is truly a bidirectional device, that is, current may flow from drain to source or source to drain once the proper gate voltage is applied and the conductive channel forms. Normally, during reverse polarity across the source/drain of a MOSFET, an internal PN junction, represented by parasitic diodes 234 and 232 in FIG. 2, will eventually turn on allowing current 271 to flow. Note that parasitic diodes 234 and 232 are not separate from the MOSFET 244 and 242; e.g. parasitic diode 234 is a PN junction that is part of the structure of transistor 244. Once the gate voltage is removed the parasitic diode conducts during reverse current flow which makes a single MOSFET unsuitable for the control of alternating current 271 273. The common source configuration of MOSFET 242 and 244 of FIG. 2 results in one of the parasitic diodes in a reverse biased state which substantially prevents current flow through the parasitic diodes 232 234 when the MOSFETs are in either the conducting or nonconducting states.

Referring again to FIG. 1, switch control circuit 140 and charge pump circuitry 150 are utilized to provide control for the application of the voltage to the gates of MOSFETs 142 144. In the embodiment illustrated, switch control circuit 140 may be an externally controlled pulse width modulation circuit. In the embodiment illustrated, charge pump 150 utilizes the AC line to power the pulse width modulation circuitry. In addition, the frequency of the modulated control signal may be fixed, whereas the duty cycle of the modulation, as described below, is utilized to determine the power to be delivered to the load 130. In an alternative embodiment the gate and source of the AC MOSFET may be driven by a circuit which has a minimum conduction time combined with a variable frequency to determine the power to be delivered to the load 130.

Figure 3:
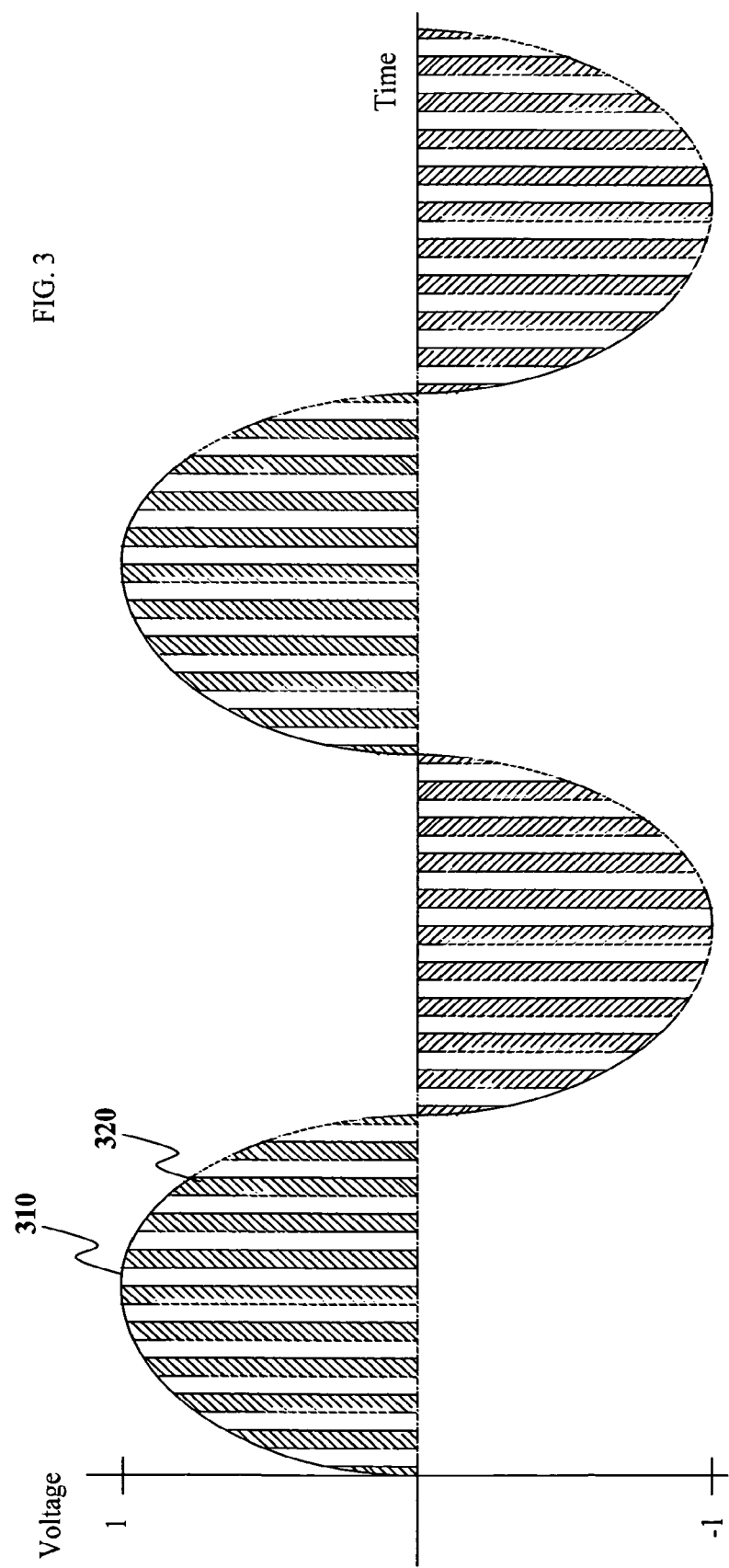
FIG. 3 illustrates current that is delivered to a load when one embodiment of the AC MOSFET switch is utilized to control current.

FIG. 3 illustrates current that is delivered to a load when one embodiment of the AC MOSFET switch is utilized to control current. For example, as discussed above with respect to FIG. 1, the switch control circuit 140 may be a pulse width modulation circuit. In such a case, the power delivered to the load 130 can be controlled by changing the duty cycle of the pulse control signal. FIG. 3 illustrates an example input voltage 310 from the line and neutral. Illustrated also, in the dark shaded regions 320, are the periods where the AC MOSFET switch 110 is switched on to allow current to flow through the load 130. The voltage 310 and current 320 are normalized so that they share a common envelope. Thus, in the illustrated embodiment, a 50% duty cycle signal driving the gate to source voltage will result in an effective power of one half the total power available being delivered the load. By utilizing a pulse width modulation technique, the level of power delivered to the load can be adjusted by controlling the width of the pulses generated by the pulse width modulation of the switch control circuit. The equation governing the power transfer to the load is:

$$Pavg = \frac{Vrms^2}{R} \cdot d.$$

Where $V_{rms}$ is the Root Mean Square (rms) voltage of the AC power source, R is the resistance of the load and d is the duty ratio of the pulse width modulator driving the AC MOSFET. By inspection of this equation, the power transferred to the load is a linear function of the duty ratio of the pulse width modulator. The load is at zero power when the duty ratio is zero and at maximum power when the duty ratio is 1.

In an alternative embodiment in which the gate and source of the AC MOSFET switch are driven by a circuit which has a minimum conduction time combined with a Variable Frequency Oscillator (VFO) the power delivered to the load 130 is determined by $$P = V^2 \div R \times f \times T_{min}$$

Where V is the rms voltage of the AC power source, R is the resistance of the load, f the frequency of the VFO driving the AC MOSFET and $T_{min}$ the minimum conduction time allowed. By inspection, this equation shows that the power transferred to the load is a linear function of the frequency of the VFO. The load is at zero power when the VFO frequency is 0 and at maximum power when the period of the frequency of the VFO is equal to or less than the minimum allowed conduction time $T_{min}$.

The above examples operate to facilitate the switching of the alternating current at relatively higher frequencies. There are advantages to switching the current at relatively higher frequencies. Switching frequencies out of the audio range (e.g. greater than 20 KHz) can be utilized to reduce human factor issues associated with audible switching noise. Another advantage of operation at higher frequencies may be a reduction in switching and conduction losses. Implementations operating at significantly lower frequencies spend more time in the linear region of operation. Spending more time in the linear region during switching may dissipate significant amounts of additional energy in the form of heat as relatively slow transitions are made through this linear region. In addition, because of the relatively low voltage drops associated with the disclosed switching of alternating current, less energy is dissipated from the product of the current flowing across the voltage drops of the devices. In addition, the AC MOSFET switching circuit above does not introduce significant harmonics into the alternating current. This can reduce costs associated with filtering these harmonics to meet international regulatory requirements.

Figure 4A:
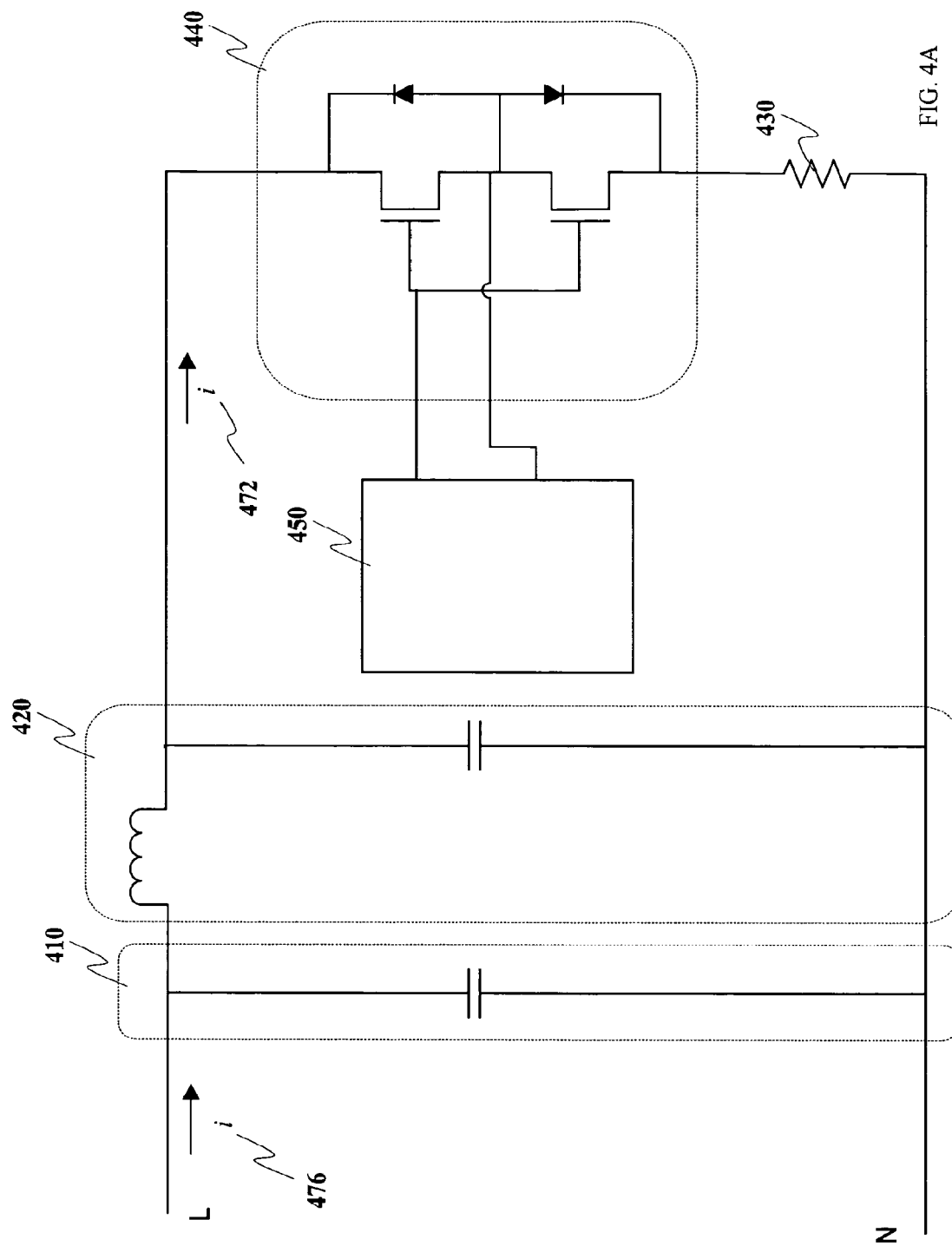
FIGS. 4A-4C illustrate a power filter and its effects on the current drawn by a load driven by an AC MOSFET switch, in accordance with one embodiment.

FIG. 4A illustrates input circuitry for an AC MOSFET switch, in accordance with one embodiment. Illustrated is a filter stage 410 to provides a high frequency short to ground to any transients or conducted emissions that occur across the inputs. Illustrated also is a filtering stage 420 to provide smoothing of the alternating current drawn by the load 430. The effect of this filter is to smooth the harmonic rich current drawn by the pulse width modulated, or VFO driven load, such that the power source experiences a continuous current flow with virtually no harmonic current content.

Figure 4B:
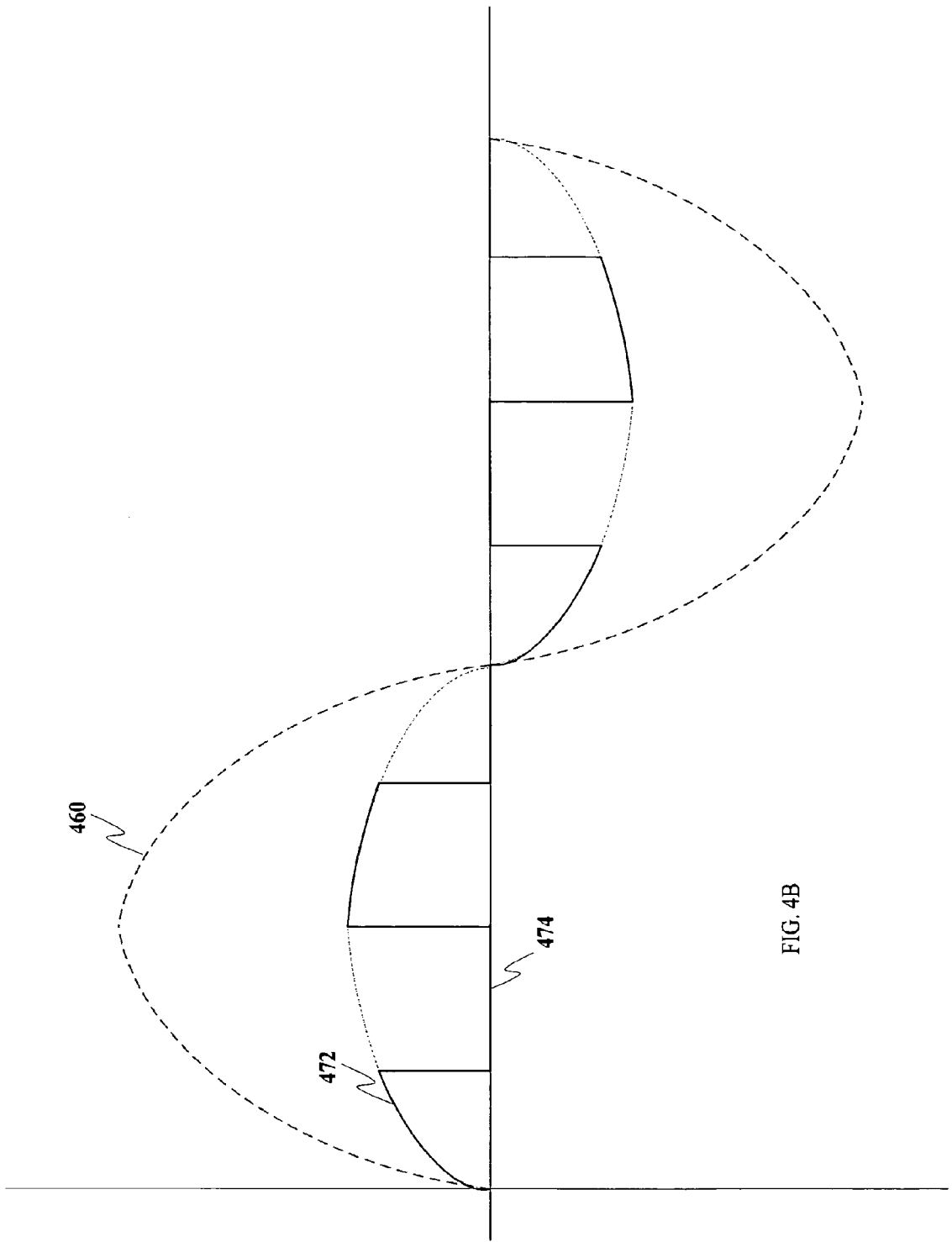
Figure 4C:
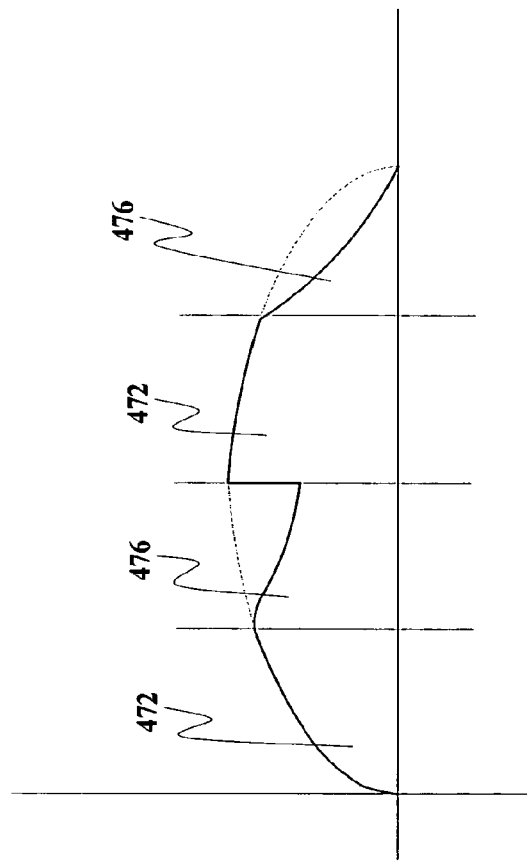

In the embodiment, switch control circuit 450 switches the current 472 delivered to the load as illustrated in FIG. 4B. During times of switching, assuming a purely resistive load, the current 472 through the load 430 will follow the line voltage provided, that is, it will be in phase. When the switch is turned off, the current delivered to the load will drop to zero 474. Thus, as can be seen there will be dramatic shifts or steps in the current drawn by the load as the switch turns on and off. These step changes in the current represent unwanted current harmonics placed on the AC power source which may exceed regulatory limits. To solve this problem, filtering stage 420 is added to the circuit. FIG. 4C illustrates the current drawn from the AC power source at the line and neutral connections by the switched load as a result of the filtering stage 420. When the switch is turned off, the filtering stage 420 smoothes current 476 drawn by the load 430. In the case in which the switch is driven by a pulse width modulator, the total instantaneous current drawn by the circuit may be the sum of the fundamental current and the instantaneous value of the ripple current. This instantaneous current may be expressed as $$i_L(t) = \frac{V \cdot d}{R} \cdot \sin(2 \cdot \pi \cdot f_o \cdot t) + \frac{\pi^2}{4} \cdot (1-d) \cdot \left(\frac{f_c}{f_s}\right)^2 \cdot \frac{V \cdot d}{R} \cdot \sin(2 \cdot \pi \cdot f_o \cdot t) \cdot \sin(2 \cdot \pi \cdot f_s \cdot t).$$

where $f_C$ is the resonant frequency of filtering stage 420, $f_S$ is the switch frequency of the pulse width modulator, $f_O$ is the frequency of the AC power source, d is the duty cycle of the pulse width modulator, V is the peak source voltage, and R is the load resistance 430. Under direct examination of this equation it is noted that, as the switch frequency of the pulse width modulator is increased, the resultant alternating current waveform at the Line and Neutral connections smoothes dramatically.

Figure 5:
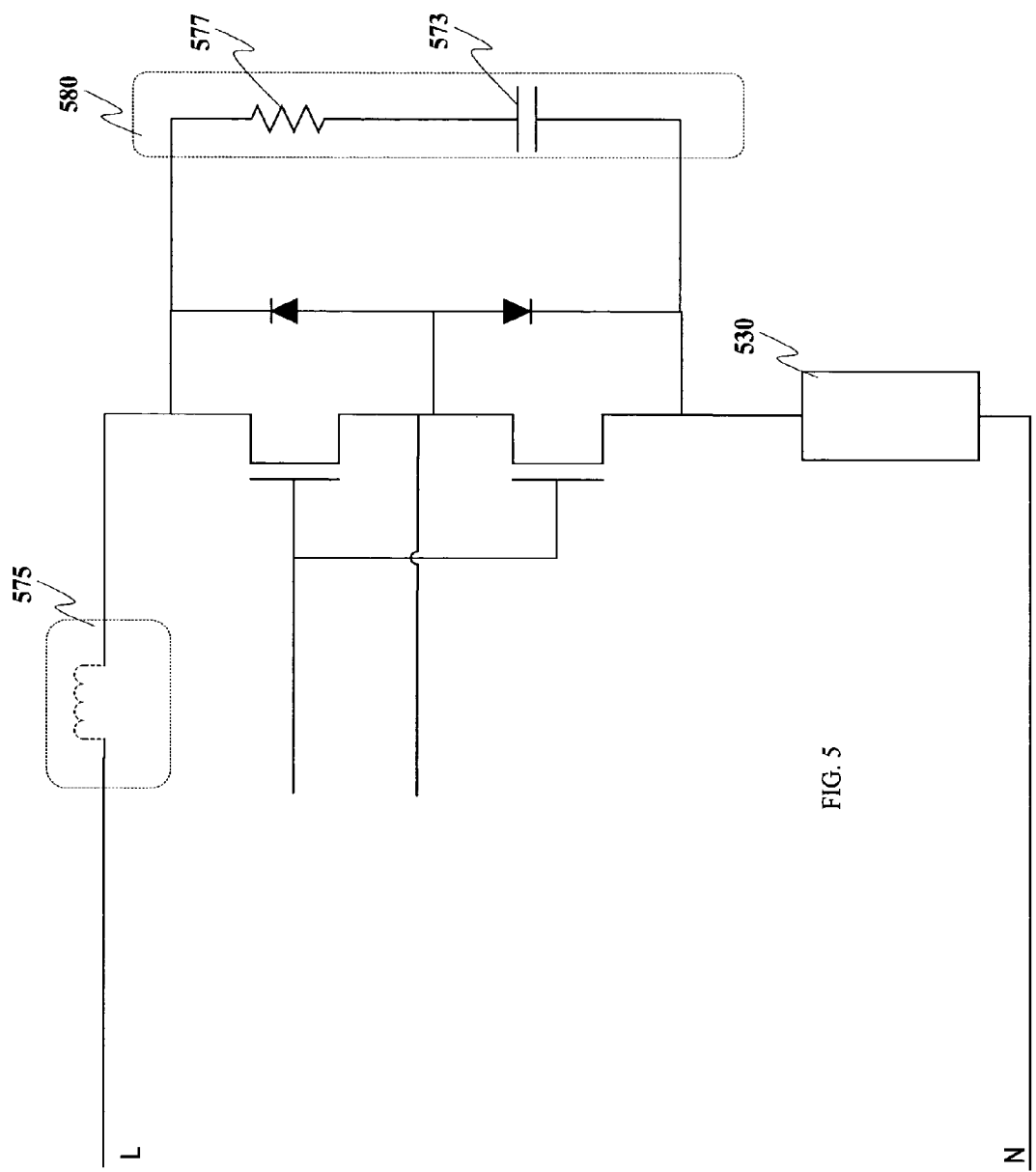
FIG. 5 illustrates an AC MOSFET switch design including a snubbing device, in accordance with one embodiment.

FIG. 5 illustrates an AC MOSFET switch design including a snubbing device 580, in accordance with one embodiment. Snubbing device 580 is utilized for dissipating energy stored in the circuit. Stored energy in a circuit exists due to various factors associated with the circuit such as: parasitic inductance associated with the wiring providing the AC current, parasitic inductance in the components leads, and inductance in the load itself. Snubber designs are designed to capture a portion of the stored energy in a circuit, when the circuit is switched off. These snubber designs are to reduce, among other things, the resonance of the circuit. However, these snubber designs are not engineered to dissipate all the energy; they are simply designed to dissipate enough energy to reduce resonance and the resulting resonant "over" voltages that may otherwise occur.

To dissipate all the energy in the circuit, a significantly larged sized capacitor 573 may be used in snubber 580 design. It is desirable to have the resistance 577 approximately match the resistance in the load 530. Thus, if the load resistance is approximately 20 ohms, then the resistance of the snubber should be selected to be about 20 ohms. In addition, the stored inductance 575 for a typical circuit driving the AC MOSFET switch has been measured at approximately 100 nanoHenries. In some snubber designs, a capacitor capable of capturing about ⅕ of the energy stored in the inductive parasitics may be utilized. As mentioned, this capacitor size is utilized to simply avoid resonance of the circuit. However, the remaining energy is dissipated via heat in the switching element or as Radio Frequency (RF) emissions. To avoid this heat or RF emissions, a larger snubber circuit may be utilized.

In order to have the snubber dissipate substantially all the stored energy of the circuit, the energy dissipated by the snubber should equal the energy stored due to the inductance of the circuit. Thus, $$\tfrac{1}{2}LI^2 = \tfrac{1}{2}CV^2, \text{ where } I = V/R$$

$$\tfrac{1}{2}L(V/R)^2 = \tfrac{1}{2}CV^2$$

Solving for C we find that:

$$C = L/R^2$$

Thus, the capacitor used is directly related to the value of the parasitic inductance.

Dissipating heat may be undesirable as it may result in damage to the circuit. A solution to this may be to include a heat sink. However, the addition of the heat sink may add cost to the design. In addition, generation of RF emissions may be undesirable as it may result in poor classification during RF certification proceedings for the device containing the AC MOSFET switch. To protect from RF emissions, a shield for the RF emissions may be provided. Again, however, the addition of a shield may add cost to the design.

Thus, in one embodiment, the capacitor that is part of the snubber illustrated in FIG. 5 is designed to capture substantially all of the stored energy in the circuit associated with the AC MOSFET switch. In this manner, the design of RF shield and the design of any heat dissipating devices may be reduced.

Figure 6:
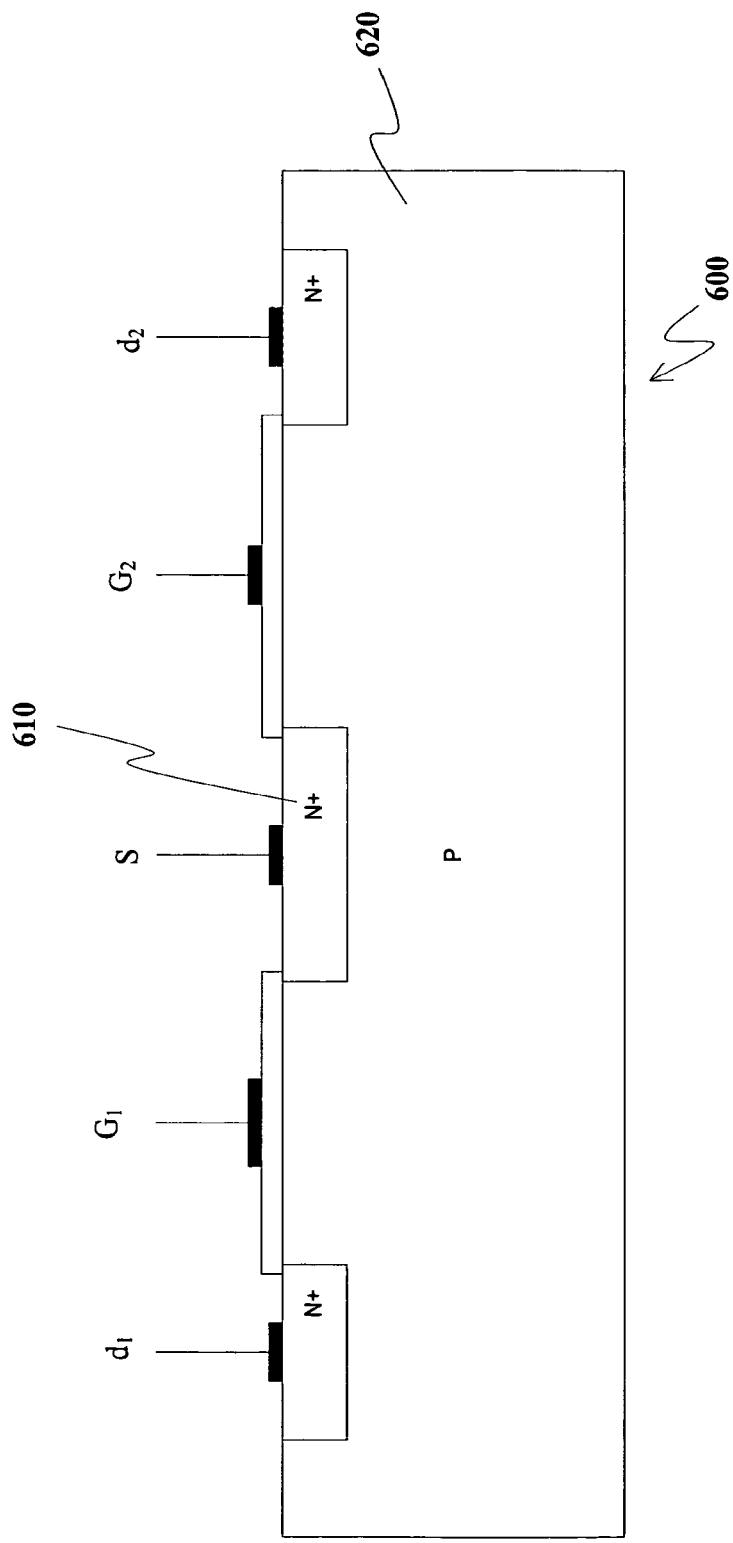
FIG. 6 illustrates a single IC device containing two NMOS type MOSFET devices of an AC MOSFET switch, in accordance with one embodiment.

FIG. 6 illustrates a single integrated circuit (IC) device 600 containing two NMOS type MOSFET devices of an AC MOSFET switch, in accordance with one embodiment. In an alternative embodiment, two PMOS type MOSFET devices may be utilized in the construction of an AC MOSFET switch. Recall that the two sources from the two MOSFETs are logically coupled to each other in the AC MOSFET switch. By fabricating the two MOSFETs in a single package on an IC, the two MOSFETs may share a common source region 610 on the IC. In the embodiment illustrated in FIG. 6, a common source region 610 is implanted into the die containing the AC MOSFET switch. The sharing of the common source region 610 may allow the use of a single source lead emanating from the package containing the two MOSFETs of AC MOSFET switch. This, in turn, may result in decreased conduction resistance due to the elimination of one source lead and the source lead's associated wire bonding parasitics, such as ohmic resistance from the die to a package lead. For example, in one embodiment, the elimination of one of the source leads may reduce the impedance by 70 milliohms, corresponding to the impedance associated with one of the leads to the AC MOSFET switch.

70 milliohms may be a substantial portion of the overall resistance associated with the AC MOSFET switch. For example, assume an $R_{DSON}$ of 100 milliohms for each MOSFET in the AC MOSFET switch. Thus, with a 70 milliohm resistance for each lead for the source and drain, the overall path impedance across the source and drain is 240 milliohms. Two discrete series devices have an effective resistance through the AC MOSFET switch of 480 milliohms. Recall that the external source lead in the AC MOSFET is used for the application of gate bias and as a conduction path for certain types of snubber applications during switch turn off. By design the external source connection 610 has very low current flow and does not introduce series resistance to the AC MOSFET switch when the switch is conducting. This fact allows the conduction resistance of the AC MOSFET switch to be reduced by 140 milliohms, or a reduction in effective resistance 30% by using a common source region on the die of the AC MOSFET and the elimination of one lead. Since the power dissipated is directly related to the resistance, this results in a 15% reduction in power loss, for the embodiment described. Fabrication of the AC MOSFET switch on a single die also allows one of the gate terminals of the discrete implementation to be eliminated. The result of the common source region and eliminated gate terminal is a four pin device with two high current drain connections and two lower current gate and source connections. One pin of the four pin device is coupled to each of the gates of the two MOSFETs. Another pin is coupled to the common source region, and each of the two remaining pins are coupled to a different one of the drains.

Thus, embodiments of an AC MOSFET switch design have been disclosed. This design generally allows for faster operation of the AC MOSFET switch to, among other things, allow operation significantly above the audio frequency spectrum (e.g. greater than 20 kHz). The AC MOSFET switch operation generally utilizes higher frequencies which, in turn, allows the device to be used in a broad range of AC power control, thus reducing the use of rectification and the resulting induction of harmonics to the power line. These advantages reduce the use of expensive filtering and allow for better operation in environments containing persons such as the home or office environment. The designs may also allow for single IC design of the AC MOSFET switch in many applications. This may reduce the number terminal thus reducing loss due to lead resistance.

While various circuit elements are illustrated, it is understood by those skilled in the art that equivalent circuit elements can be utilized without altering the spirit of the embodiment disclosed. For example, in the place of a single bias capacitor, multiple parallel capacitors may be utilized to obtain a desired effective capacitance. The term "capacitor" as used herein (in the specification and in the claims) includes its common meaning as understood by those of ordinary skill in the art, i.e. an electronic device with the ability of storing charge, as well as other devices or combination of devices configured to provide the ability to store charges.

The bias circuitry utilized to drive control circuitry of the AC MOSFET switch may be combined with the snubber circuitry. By combining the bias circuitry with the snubber circuitry, power that may otherwise be wasted in the snubber circuitry may be utilized to drive the control circuitry.

Figure 7:
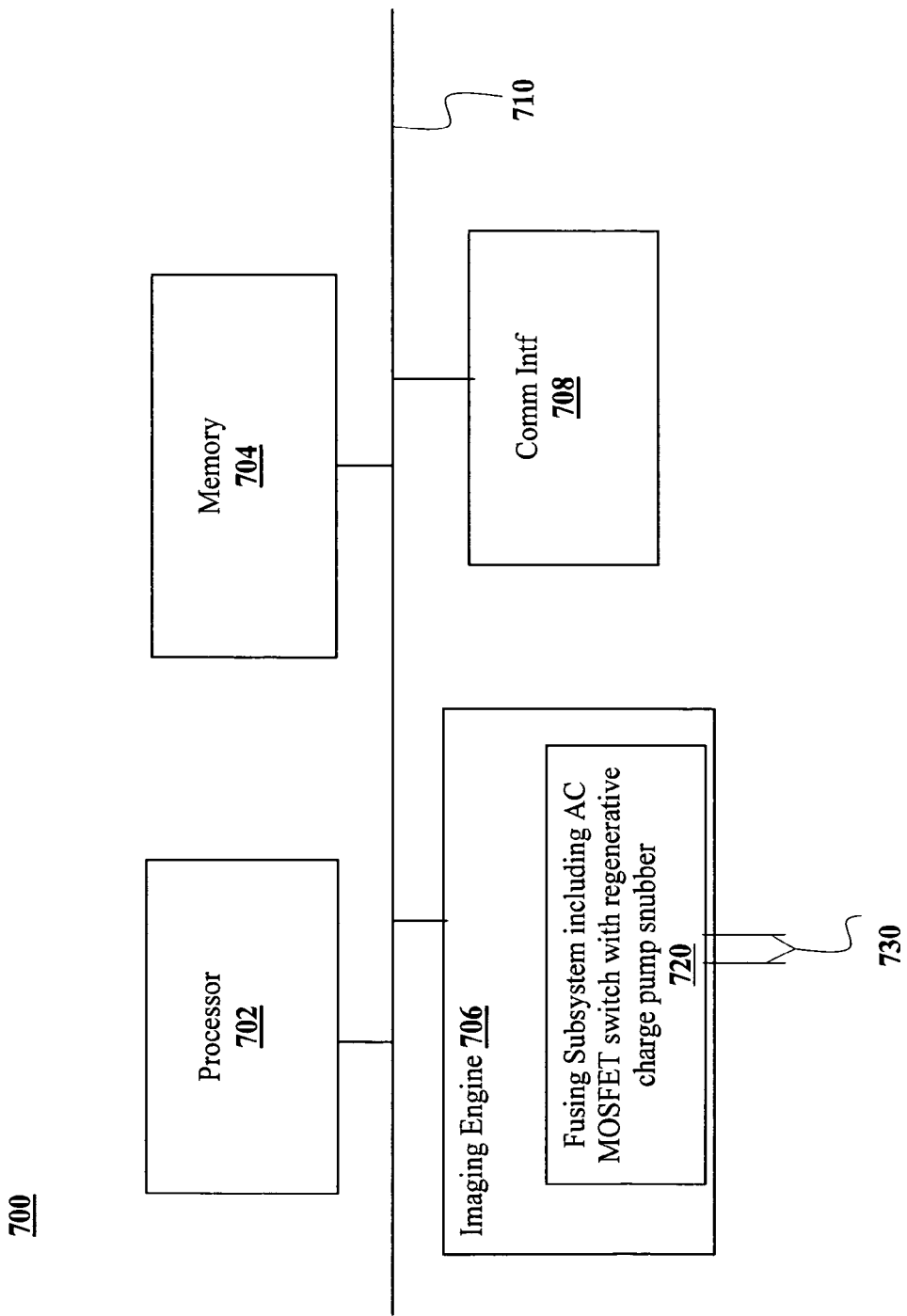
FIG. 7 illustrates an imaging device, suitable for housing an apparatus utilizing a snubber circuit, in accordance with one embodiment.

FIG. 7 illustrates an imaging system 700, suitable for housing an apparatus utilizing a snubber circuit, in accordance with one embodiment. As illustrated, for the embodiment, imaging system 700 includes processor/controller 702, memory 704, imaging engine 706 and communication interface 708 coupled to each other via bus 710. Imaging engine 706 comprises a fusing subsystem 720 for fusing toner to paper. In addition to fusing subsystem, imaging system may comprise other inductive heating elements or induction motors. Imaging engine 706 is similar to those found in many imaging systems, such as those available from Hewlett Packard Corp. of Palo Alto, Calif. Fusing subsystem 720 is connected to an alternating current power source through interface 730. Fusing subsystem 720 may utilize a snubber circuit as described by the present disclosure.

Processor 702, in combination with other portions of the imaging system 700, can perform various control functions of the fusing subsystem 720. For example, in one embodiment, processor 702 controls power management of the fusing subsystem 720 to intelligently power down the fusing subsystem when the fuser is not in use. Otherwise, processor 702, memory 704, imaging engine 706, comm. interfaces 708, and bus 710 represent a broad range of such elements.

Figure 8:
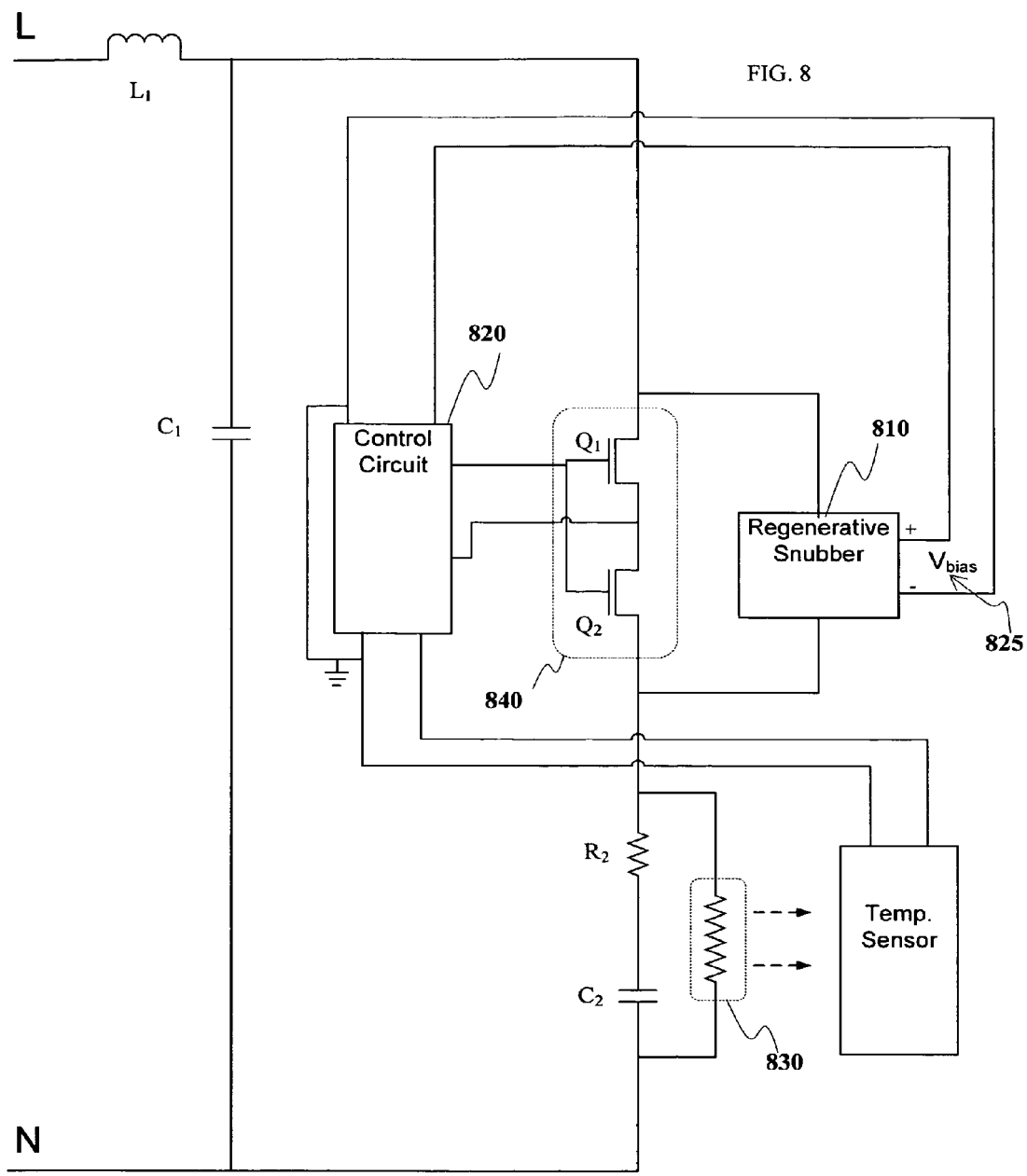
FIG. 8 illustrates a fuser power control circuit utilizing an AC MOSFET switch including a regenerative snubber, in accordance with one embodiment.

FIG. 8 illustrates a fuser power control circuit utilizing an AC MOSFET switch 840 including a regenerative snubber 810, in accordance with one embodiment. A control circuit 820, such as a linear analog pulse width modulator (PWM), controls power delivered to a fusing heating element 830 by an AC MOSFET switch 840. As the control circuit 820 turns off the AC MOSFET switch 840, current is diverted through regenerative snubber 810. Regenerative snubber 810 contains circuitry to generate bias voltage 825. Thus, in this embodiment, the control circuit 820 is biased via the regenerative snubber 810.

Thus, a significant portion of the energy that would otherwise be dissipated as heat in a lossy snubber, e.g. resistor and capacitor snubber, can be "recaptured" and utilized. As illustrated in FIG. 8, the energy can be utilized to bias the control circuit 820. In other words, the snubber and the bias circuitry can be combined into a single circuit. In addition, depending on the design of the snubber and bias available from the snubber, other items in a system could be powered via the snubber circuitry. For example, in a device dissipating a large amount of heat which requires a cooling fan, the cooling fan, in addition to or in lieu of the control circuit, could be powered by the regenerative snubber.

Figure 9:
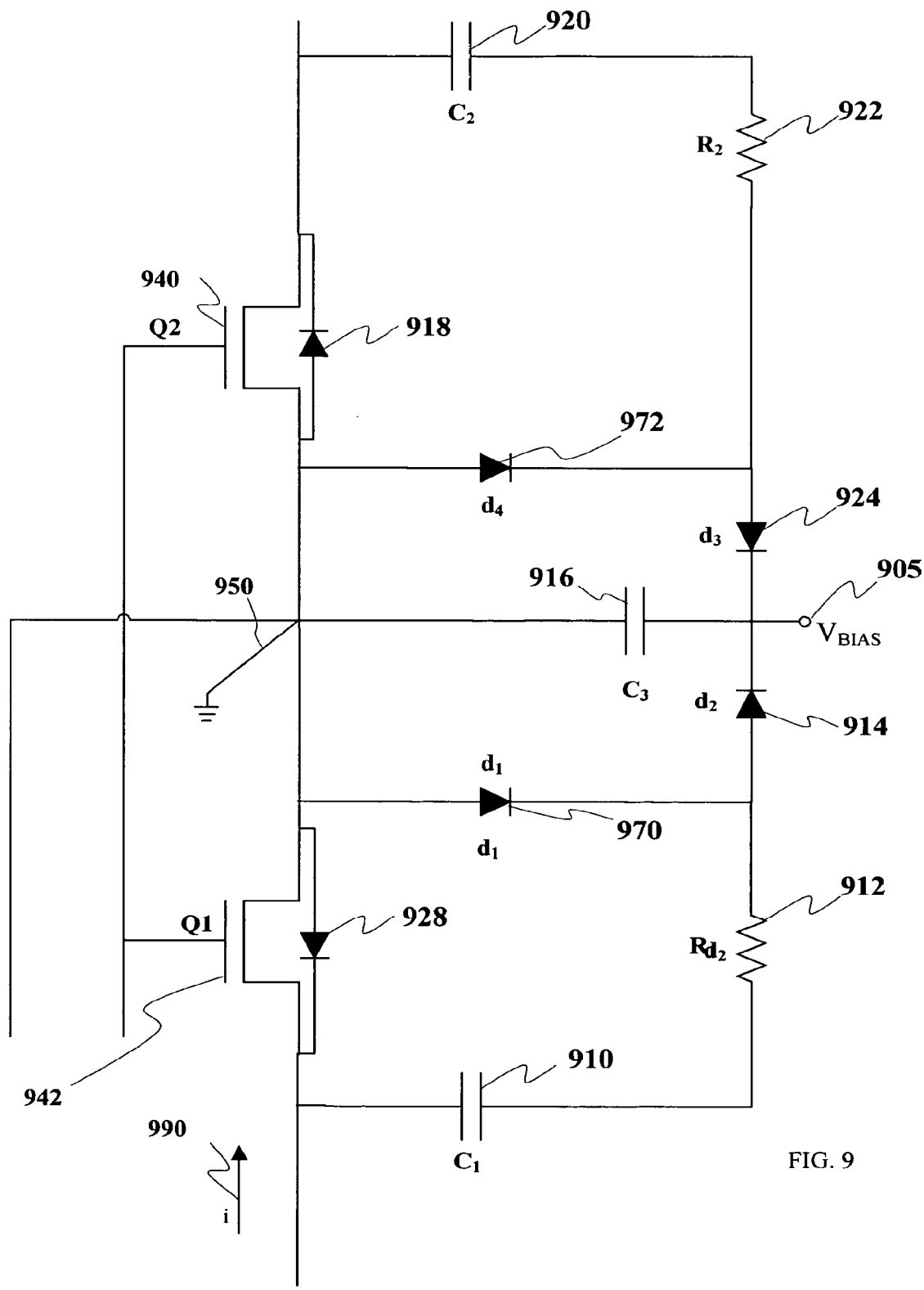
FIG. 9 illustrates combined snubber and bias circuitry, in accordance with one embodiment.

FIG. 9 illustrates a regenerative snubber, in accordance with one embodiment. MOSFETs Q1 942 and Q2 940 and their corresponding explicit anti-parallel transistor diodes 928 918 form an AC MOSFET switch as previously described. When the current i 990 flows as illustrated, and Q1 942 and Q2 940 are turned off, e.g. the circuit enters a turn-off state, the current is diverted through energy storage device $C_1$ 910 and capture circuitry $R_1$ 912 and $d_2$ 914. This diversion causes charge to build on an energy storage device, bias capacitor $C_3$ 916. Bias capacitor $C_3$ 916 provides a bias voltage between a bias node 905 and a ground 950 for the bias circuit. Current then continues through explicit transistor diode 918 of $Q_2$ 940. When Q1 942 and Q2 940 are turned back on, $C_1$ 910 is reset. That is, the charge stored on $C_1$ 910 is discharged by flowing through Q1 942, $d_1$ 970 and is then dissipated in $R_1$ 912.

The symmetry of the snubber/biasing circuit allows for the charge to occur with both directions of AC flow. When the current 990 is reversed and $Q_1$ 942 and $Q_2$ 940 are turned off, the flow is through devices $C_2$ 920, $R_2$ 922, $d_3$ 924, charging $C_3$ 916 and then through explicit transistor diode 928 of $Q_1$ 942. When $Q_1$ 942 and $Q_2$ 940 are turned back on, $C_2$ 920 is reset and the charge stored on capacitor $C_2$ 920 flows through MOSFET $Q_2$ 940, $d_4$ 972 and is dissipated in $R_2$ 922. Thus, during the turn-off period of the AC MOSFET switch, charge is supplied to bias capacitor $C_3$ 916 resulting in bias voltages at bias node 905. The voltage between the ground 950 and bias node 905 provides bias for the control circuit.

Figure 10:
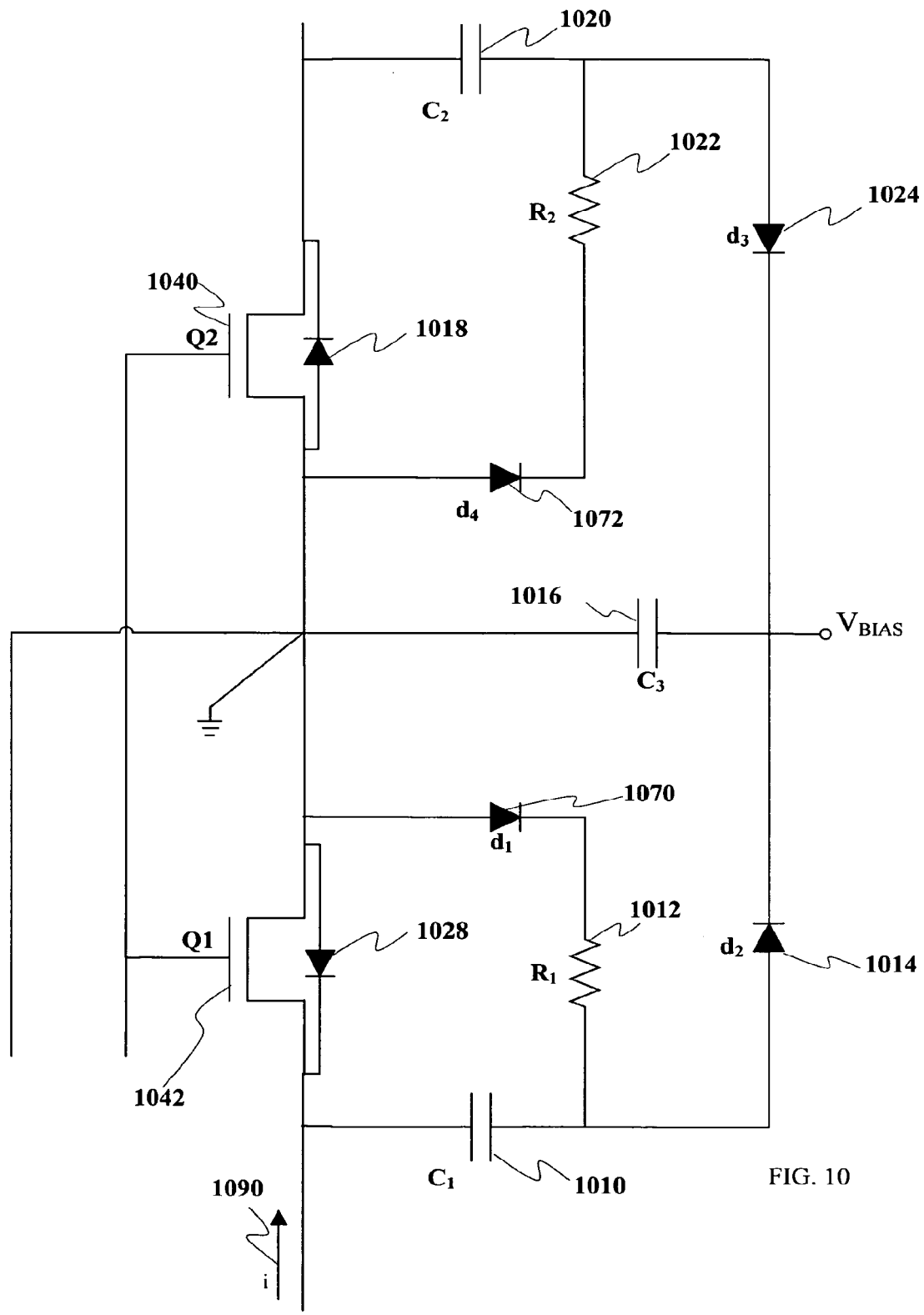
FIG. 10 illustrates combined snubber and bias circuitry, in accordance with another embodiment.

FIG. 10 illustrates a regenerative snubber, in accordance with another embodiment. Capacitor $C_3$ 1016, stores charge that can be utilized to bias a control circuit. When MOSFETs $Q_1$ 1042 and $Q_2$ 1040 are turned off, the current i 1090 flows through $C_1$ 1010 and $d_2$ 1014 and charges $C_3$ 1016. The current continues through explicit transistor diode 1018 of $Q_2$ 1040. In this embodiment, there is no resistor in the turn-off circuit to dissipate energy. Thus, during turn off, more energy may be delivered to charge $C_3$ 1016.

When MOSFETs $Q_1$ 1042 and $Q_2$ 1040 are turned on, $C_1$ 1010 resets through $Q_1$ 1042, $d_1$ 1070 and $R_1$ 1012. When current i flow 1090 reverses, similar results occur through snubbing/biasing devices $C_2$ 1020, $R_2$ 1022, $d_4$ 1072, explicit transistor diode 1028 and $d_3$ 1024.

Figure 11:
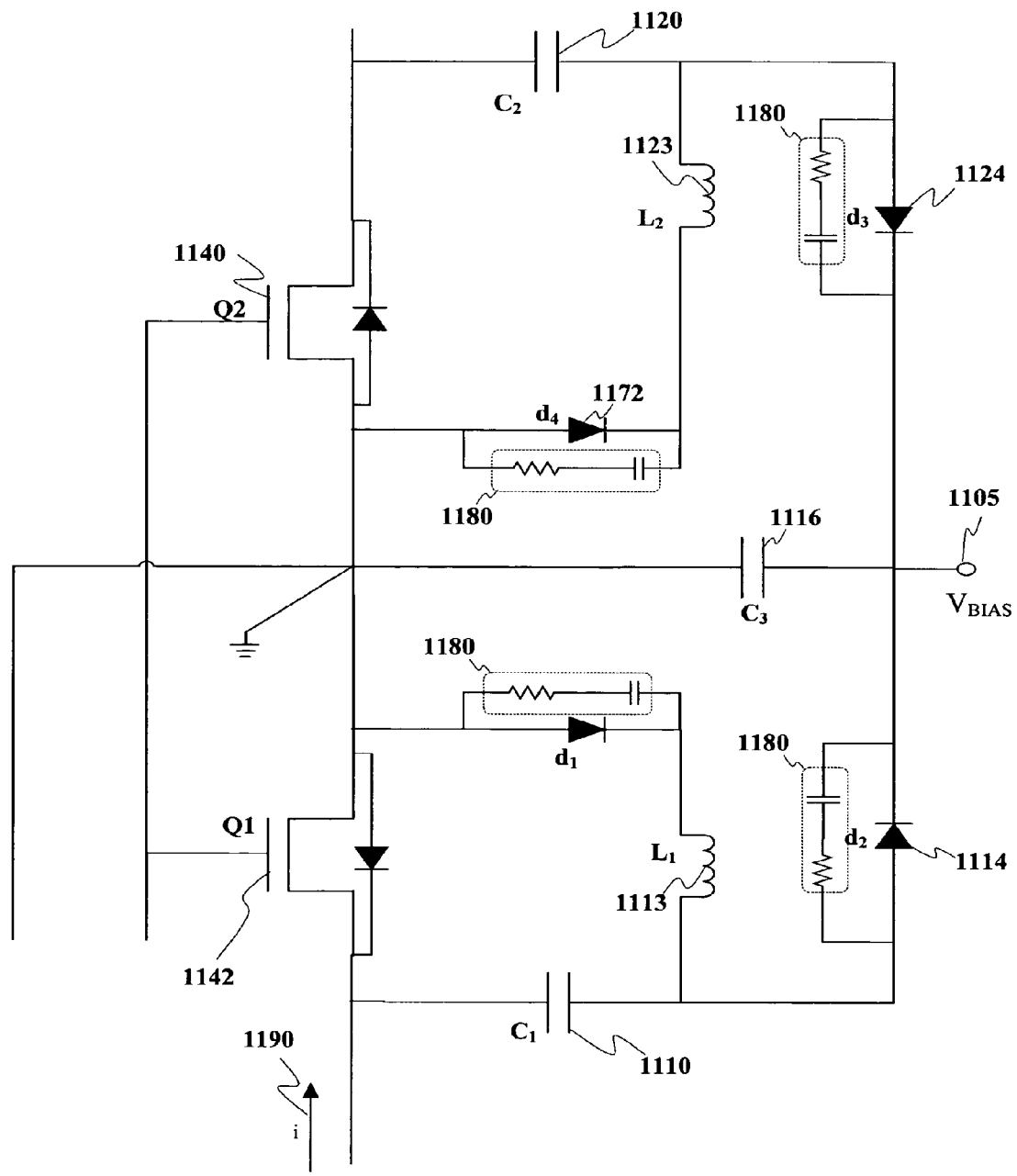
FIG. 11 illustrates a combined snubber and bias circuit, in accordance with yet another embodiment.

FIG. 11 illustrates a regenerative snubber, in accordance with yet another embodiment. By modifying the embodiment of FIG. 10, and replacing the resistors with inductors $L_1$ 1113 and $L_2$ 1123, the energy loss during reset can also be greatly reduced allowing significantly more of the snubbed energy to be captured and pumped to C3 1116. When $Q_1$ 1142 and $Q_2$ 1140 are turned off, capacitor C3 1116 is charged through either $C_2$ 1120 and $d_3$ 1124 or $C_1$ 1110 and $d_2$ 1114, as previously discussed, depending on the current direction through the MOSFETs at the time of the turn off. Assume current flow i 1190, when $Q_1$ 1142 and $Q_2$ 1140 are turned on. The charge stored on $C_1$ 1110 causes current to flow through $L_1$ 1113. The $L_1C_1$ circuit will resonate at a frequency which may be expressed as $$\omega_0 = 1/2\pi\sqrt{L_1C_1}$$

To provide adequate snubber reset, the resonant frequency of L1 C1 and L2 C2 can be chosen such that the frequency is at least as high as the minimum period expected for conduction Q1 1142 and Q2 1140.

When $Q_1$ 1142 and $Q_2$ 1140 turn on the resonance of L1 C1 results in an attempt to invert the voltage on $C_1$ 1110. When the voltage at the anode to $d_2$ 1114 reaches a potential just above that of bias node 1105, $d_2$ 1114 switches on allowing additional energy to pump into C3 1116. This embodiment advantageously reduces the amount of energy loss by removing resistors from both the turn-off and reset operation of the snubber/bias circuit.

Also illustrated in FIG. 11 are snubbers for the active devices of the snubber/bias circuitry. The circuit contains a number of diodes which may themselves be a source of conducted and radiated emission to the circuit. In order to facilitate the reduction of these conducted and radiated emissions, RC snubber circuits 1180 can be placed across the diodes.

In one embodiment, fast switching diodes are utilized in the snubber/biasing circuit. For example, diodes with switching time of 10 ns or faster may be utilized in one embodiment.

When the AC MOSFET is switching, levels of bias current provided by the circuit will be at relatively high levels compared to when the AC MOSFET is not switching. For example, assuming the AC MOSFET switch is operating at 28.5 kHz, with a line voltage of 120 $V_{RMS}$ and 0.01 µFarad capacitance for $C_1$ and $C_2$. Each of the snubber capacitors effectively "sees" the RMS voltage across it with $C_1$ 1110 seeing the first half cycle and $C_2$ 1120 seeing the second half cycle. The snubber capacitors are charging and discharging at the switch frequency. The current available to charge $C_3$ can be calculated as follows:

$$Q = i \times t = c \times v => i = (c \times v)/t = c \times v \times f$$

$$i = (0.01 \times 10^6)(120)(28500)$$

$$i = 34.2 \text{ mA}$$

This value may be doubled in the embodiment in which an inductor is used to invert the voltage of the snubber capacitor during snubber reset.

However, when the AC MOSFET switch is idle, the switching of the snubber circuit occurs with the line frequency of, for example, 50-60 Hz. In this case, the capacitor C3 1116, which see the peak value of V, will have much less current to charge it:

$$i = (0.01 \times 10^6)(120 \times \sqrt{2})(60)$$

$$i = 0.10 \text{ mA}$$

Figure 12:
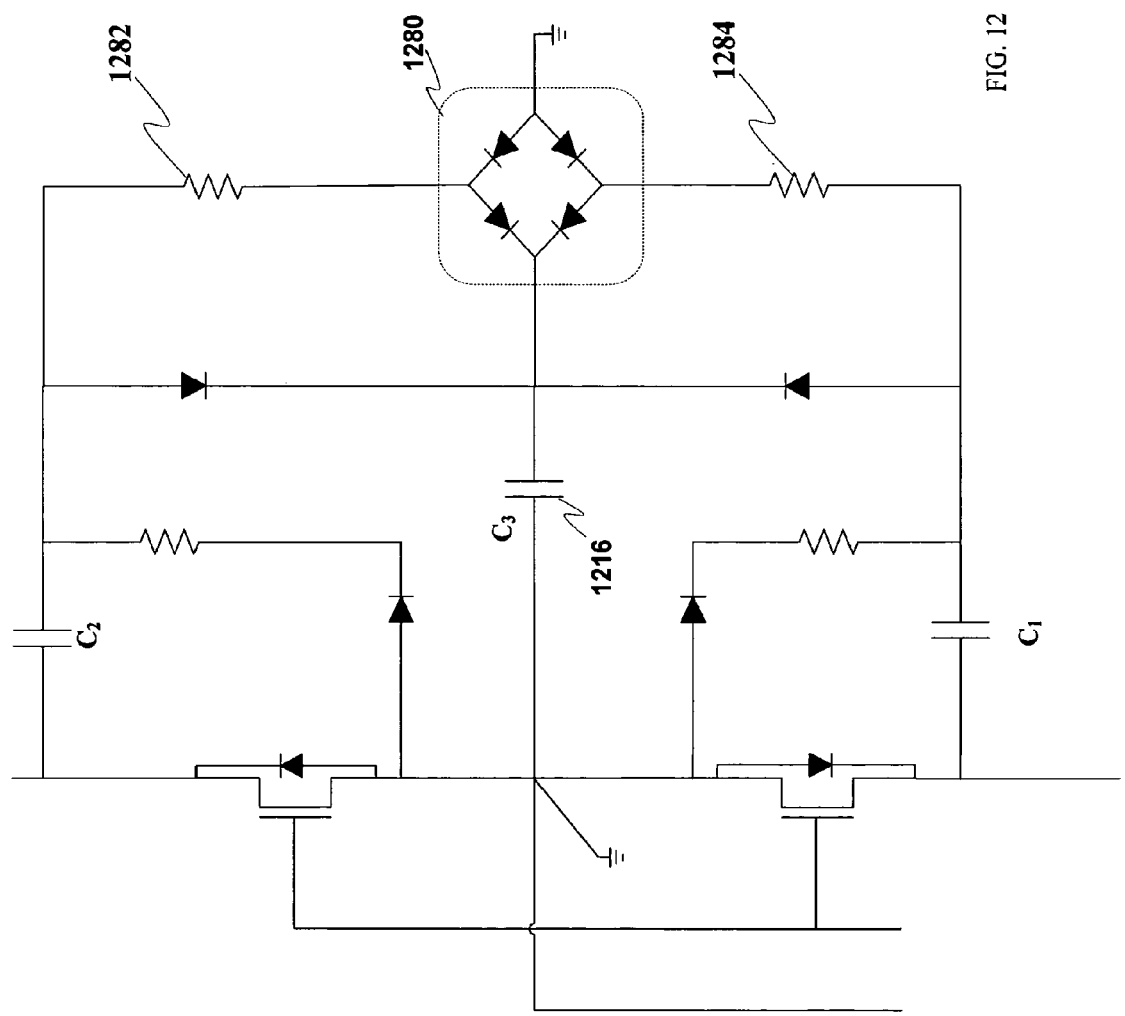
FIG. 12 illustrates a regenerative snubber, in accordance with another embodiment.

FIG. 12 illustrates a regenerative snubber, in accordance with another embodiment. In this embodiment, two series resistors $R_3$ 1282 and $R_4$ 1284 are added along with a full waver rectifier 1280. These elements may be utilized to help provide additional DC bias. This additional DC bias may be useful, when the circuit is idle, in supplying additional charge to bias capacitor $C_3$ 1216. For example, as previously noted, assuming a power source of 120 $VAC_{RMS}$, the resistors $R_3$ 1282 and $R_4$ 1284, at 60 kΩ, provide an additional:

$$(120)/(60k) = 2.0 \text{ mA}$$

Thus, by placing the full wave rectifier 1280 and series resisters $R_3$ 1282 and $R_4$ 1284 in the circuit as illustrated, the current available to the capacitor $C_3$ 1216 for providing bias to the control circuitry, while the AC MOSFET switch is idle, can be increased from 0.1 mA to 2.1 mA.

Figure 13:
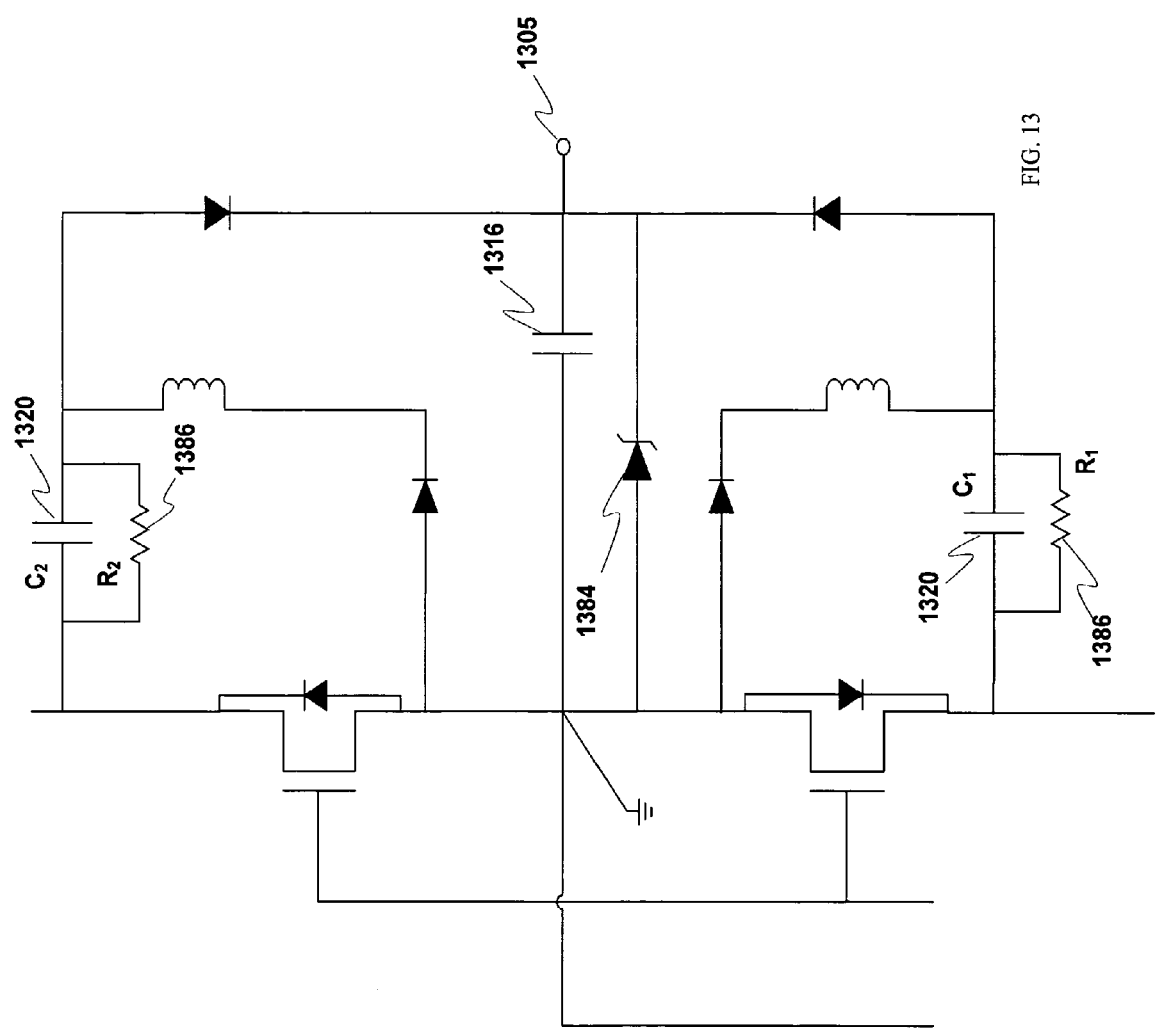
FIG. 13 illustrates a regenerative snubber with additional DC bias, in accordance with another embodiment.

FIG. 13 illustrates a regenerative snubber with additional DC bias, in accordance with another embodiment. In the circuit, in addition to the current supplied by capacitors $C_1$ 1310 and $C_2$ 1320, to charge $C_3$ 1316, resistors $R_1$ 1388 and $R_2$ 1386 are utilized to provide increased current to charge $C_3$ 1316. Similar to the calculations above, utilizing 60 kΩ resistors for $R_1$ 1388 and $R_2$ 1386 results in an additional 2.0 mA of current being available. This increases the bias current to 2.1 mA.

Also illustrated in FIG. 13 is the use of a zener diode 1384 across $C_3$ 1316. It is possible that the energy stored on $C_3$ 1316 may cause the voltage at the $V_{BIAS}$ node 1305 to rise to levels that exceed what is allowed by a control circuit biased by the regenerative snubber. In this case, by placing a zener diode 1384 with the proper breakdown voltage across the capacitance device $C_3$ 1316, a proper voltage value can be maintained at the bias node 1305. For example, if a $V_{BIAS}$ value for a control circuit of 13 volts is desired, a zener diode with a 15 volt breakdown voltage can be placed across the capacitance device $C_3$ 1316 to ensure that the voltage level across $C_3$ 1316 does not exceed 15 volts. In an alternative embodiment, a resister is placed across $C_3$ 1316 to facilitate maintenance of a voltage across $C_3$ 1316. In another embodiment an avalanche diode is utilized to ensure that a proper voltage value may be maintained at the bias node 1305.

Figure 14:
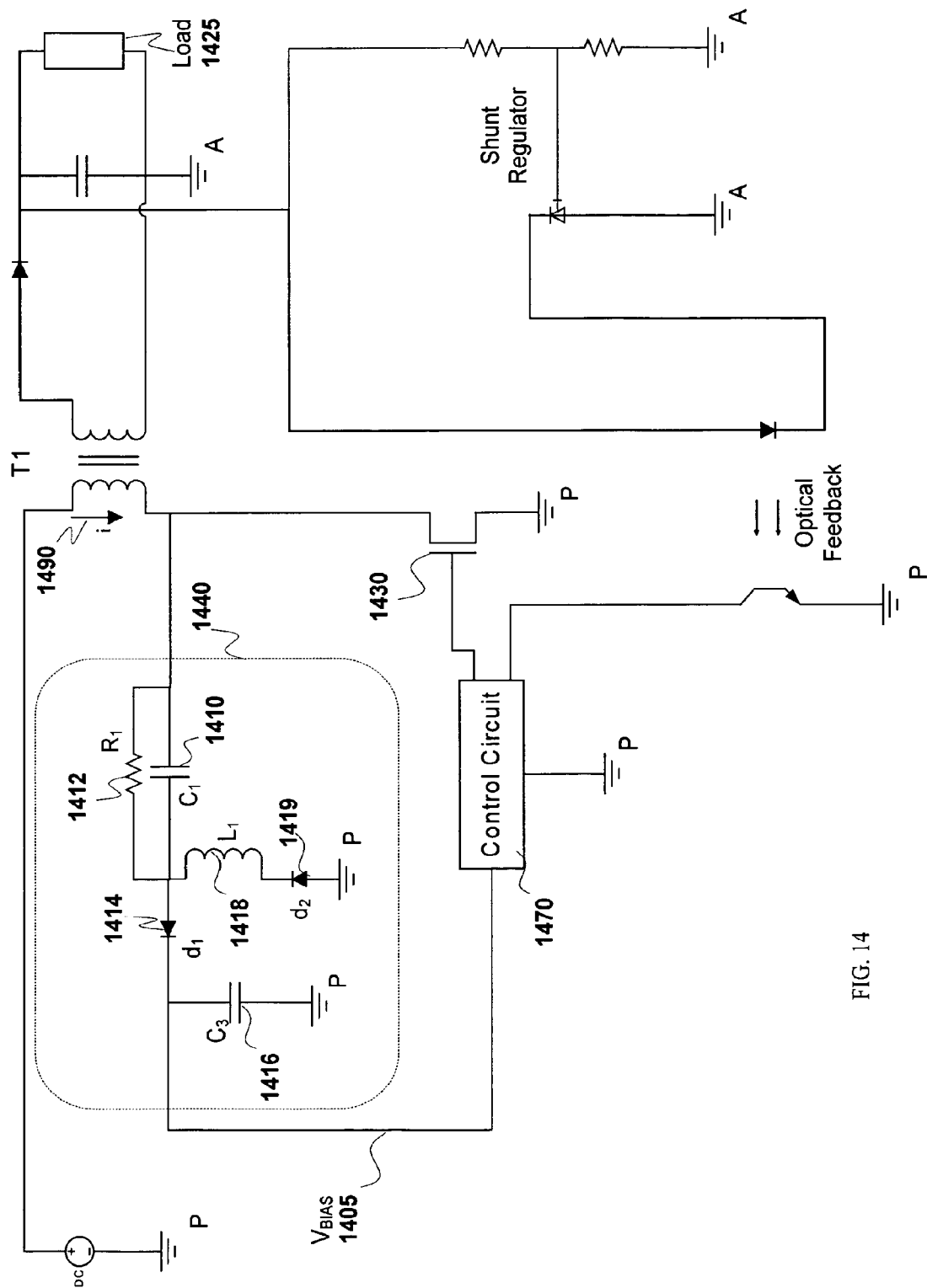
FIG. 14 illustrates a regenerative snubber in use with a DC-DC converter, in accordance with one embodiment.

While the previous embodiments illustrate a regenerative snubber in use with the AC MOSFET switch, the regenerative snubber may be used in other configurations. FIG. 14 illustrates a regenerative snubber in use with a DC-DC converter, in accordance with one embodiment. Illustrated in FIG. 14 is an electrically isolated flyback converter. Power switch 1430 is utilized to control power delivery to the load 1425. Power switch 1430 is controlled by control circuit 1470. Control circuit 1470 is biased by bias node 1405 charged by regenerative snubber 1440. While an electrically isolated flyback converter DC switching circuit is illustrated in conjunction with the regenerative snubber, other DC switching circuit types such as boost and buck-boost converters may be utilized.

Regenerative snubber 1440 is utilized to capture energy stored in the electrically isolated flyback converter when power switch 1430 is switched off. When power switch 1430 turns off, current i 1490 flows through $C_1$ 1410 and $d_1$ 1414 and charges $C_3$ 1416 and thus corresponding bias node 1405. When power switch 1430 turns on, $C_1$ 1410 resets through power switch 1430, $d_2$ 1419 and $L_1$ 1418.

During low frequency operation of the DC-DC switching circuit, sufficient current to provide adequate bias may not be provided by $C_1$ 1410. Thus, resistor $R_1$ 1412 is coupled across $C_1$ 1410 to provide additional bias. An appropriate value of $R_1$ 1412 for providing adequate bias current for bias node 1405 may be application dependant.

Thus, a unique method of providing bias for a control circuit is provided. Although specific embodiments have been illustrated and described herein, it will be appreciated by those of ordinary skill in the art that a variety of alternative and/or equivalent embodiments may be substituted for those disclosed herein without departing from the spirit and scope of the claimed subject matter. This application is intended to cover any adaptations or variations of the preferred embodiments discussed herein. Therefore it is intended that the present invention be limited only by the claims and the equivalents thereof.

The invention claimed is:

1. An apparatus comprising:
   an AC switching circuit;
   a control circuit coupled to the AC switching circuit; and
   a biasing snubber circuit coupled to the switching circuit and the control circuit to capture energy from a circuit switched by the switching circuit and to provide at least a portion of the captured energy to bias the control circuit, wherein the biasing snubber circuit comprises;
   a first and second series resistor/capacitor pair correspondingly coupled to a first and a second drain of a first and a second Field Effect Transistor (FET) of the AC switching circuit;
   a first diode coupled between a first source of the first FET and the first series resistor/capacitor pair, an anode of the first diode coupled to the first source and a cathode of the first diode coupled to the first series resistor/capacitor pair;
   a second diode coupled between a second source of the second FET and the second resistor/capacitor pair, an anode of the second diode coupled to the second source and a cathode of the second diode coupled to the second series resistor/capacitor pair;
   a third diode, an anode of the third diode coupled to the cathode of the first diode;
   a fourth diode, an anode of the fourth diode coupled to the cathode of the second diode and a cathode of the fourth diode coupled to a cathode of the third diode; and
   a capacitor coupled between coupled cathodes of the third and fourth diodes and the first and second sources, the first and second sources coupled together.

2. An apparatus comprising:
   an AC switching circuit;
   a control circuit coupled to the AC switching circuit; and
   a biasing snubber circuit coupled to the switching circuit and the control circuit to capture energy from a circuit switched by the switching circuit and to provide at least a portion of the captured energy to bias the control circuit, wherein the biasing snubber circuit comprises:
   a first terminal of a first capacitor and a first terminal of a second capacitor correspondingly coupled to a first and a second drain of a first and a second Field Effect Transistor (FET) of the AC switching circuit;
   a first series linear-device/diode pair coupled between a second terminal of the first capacitor and a first source of the first FET;
   a second series linear-element/diode pair coupled between a second terminal of the second capacitor and a second source of the second FET;
   a first diode, wherein an anode of the first diode is coupled to the second terminal of the first capacitor;
   a second diode, wherein an anode of the second diode is coupled to the second terminal of the second capacitor and a cathode of the second diode is coupled to a cathode of the first diode; and
   a bias capacitor coupled between coupled cathodes of the first and second diodes and the first and second sources, the first and second sources coupled together.

3. The apparatus of claim 2 wherein the first series linear-device/diode pair comprises a first resistor and a third diode and the second series linear-device/diode pair comprises a second resistor and a fourth diode.

4. The apparatus of claim 2 wherein the first series linear-device/diode pair comprises a first inductor and a third diode and the second series linear-device/diode pair comprises a second inductor and a fourth diode.

5. The apparatus of claim 4 wherein anodes of third and fourth diodes are coupled to the coupled sources and cathodes of the third and fourth diodes are correspondingly coupled to the first and the second inductors.

6. The apparatus of claim 2 wherein the biasing snubber circuit further comprises:
   a first terminal of a first resistor and a first terminal of a second resistor correspondingly coupled to the anode of the first diode and the anode of the second diode;
   a full wave diode bridge rectifier having four bridge diodes, wherein a first terminal of the full wave bridge rectifier coupled to the bias capacitor, a second terminal of the full wave bridge rectifier coupled to a second terminal of the first resistor, a third terminal of the full wave bridge rectifier coupled to a second terminal of the second resistor and a fourth terminal of the full wave bridge rectifier coupled to a ground node, the ground node comprising the coupled first and second sources.

7. The apparatus of claim 2 wherein the biasing snubber circuit further comprises: a first resistor wherein a first terminal of the first resistor is coupled to the first terminal of the first capacitor and a second terminal of the first resistor is coupled to the second terminal of the first capacitor; and
   a second resistor wherein a first terminal of the second resistor is coupled to the first terminal of the second capacitor and a second terminal of the second resistor is coupled to the second terminal of the second capacitor.

8. An imaging system comprising:
   a processor;
   a networking interface; and
   an imaging subsystem coupled to the processor, the imaging subsystem including:
   an AC switching circuit;
   a control circuit coupled to the switching circuit; and
   a biasing snubber circuit coupled to the switching circuit and the control circuit, wherein the biasing snubber circuit captures energy from a circuit switched by the switching circuit and wherein biasing snubber circuit provides at least a portion of the captured energy to bias the control circuit, wherein the biasing snubber circuit comprises:
   a first terminal of a first capacitor and a first terminal of a second capacitor correspondingly coupled to a first and a second drain of a first and a second Field Effect Transistor (FET) of the AC switching circuit;
   a first series linear-device/diode pair coupled between a second terminal of the first capacitor and a first source of the first FET;
   a second series linear-device/diode pair coupled between a second terminal of the second capacitor and a second source of the second FET;
   a first diode, wherein an anode of the first diode is coupled to the second terminal of the first capacitor;
   a second diode, wherein an anode of the second diode is coupled to the second terminal of the second capacitor and a cathode of the second diode is coupled to a cathode of the first diode; and
   a bias capacitor coupled between coupled cathodes of the first and second diodes and the first and second sources, the first and second sources coupled together.

9. The imaging system of claim 8 wherein the switching system comprises an AC switching system.

10. The imaging system of claim 9 wherein the AC switching circuit comprises:
- a first Field Effect Transistor (FET) having a first source, a first gate and a first drain;
- a second FET having a second drain, a second source coupled to the first source and a second gate coupled to the first gate;
- a first diode having a first anode coupled to the first source and a first cathode coupled to the first drain; and
- a second diode having a second anode coupled to the second source and a second cathode coupled to the second drain.

11. The imaging system of claim 8 wherein the biasing snubber circuit is configured to provide charge for storage on a charge storage device during a first phase of an AC flow and second electrical circuitry to provide charge for storage on the charge storage device during a second phase of the AC flow.

12. The imaging system of claim 9 wherein the biasing snubber circuit comprises:
- a first terminal of a first capacitor and a first terminal of a second capacitor correspondingly coupled to a first and a second drain of a first and a second Field Effect Transistor (FET) of the AC switching circuit;
- a first series linear-device/diode pair coupled between a second terminal of the first capacitor and a first source of the first FET;
- a second series linear-device/diode pair coupled between a second terminal of the second capacitor and a second source of the second FET;
- a first diode, wherein an anode of the first diode is coupled to the second terminal of the first capacitor;
- a second diode, wherein an anode of the second diode is coupled to the second terminal of the second capacitor and a cathode of the second diode is coupled to a cathode of the first diode; and
- a bias capacitor coupled between coupled cathodes of the first and second diodes and the first and second sources, the first and second sources coupled together.

13. The imaging system of claim 8 wherein the first series linear-device/diode pair comprises a first inductor and a third diode and the second series linear-device/diode pair comprises a second inductor and a fourth diode.

14. The imaging system of claim 8 further comprising a load coupled to the AC switching circuit.

15. The imaging system of claim 14 wherein the load comprises an inductive heating device.

16. The imaging system of claim 14 wherein the load comprises a single phase induction motor.

17. The imaging system of claim 8, wherein the switching circuit comprises an AC switching circuit comprising:
- a first Field Effect Transistor (FET) having a first source, a first gate and a first drain;
- a second FET having a second drain, a second source coupled to the first source and a second gate coupled to the first gate;
- a first diode having a first anode coupled to the first source and a first cathode coupled to the first drain; and
- a second diode having a second anode coupled to the second source and a second cathode coupled to the second drain.

18. The imaging system of claim 8 further comprising:
- a first energy storage device;
- circuitry coupled to the first energy storage device to facilitate capturing, by the first energy storage device, energy of the switching circuit and to facilitate resetting of the first energy storage device; and
- a second energy storage device coupled to the first energy storage device to store the captured energy and to provide at least a portion of the captured energy to the control circuit.

19. The imaging system of claim 18, wherein the switching circuit is a DC switching circuit.

20. The imaging system of claim 8, wherein the switching circuit is configured to switch the first current limiting device into circuit when the first snubbing capacitor is reset.

* * * * *